July 28, 1925.
P. WERTZ
TIRE MOUNTING AND REMOVING DEVICE
Filed Nov. 26, 1924
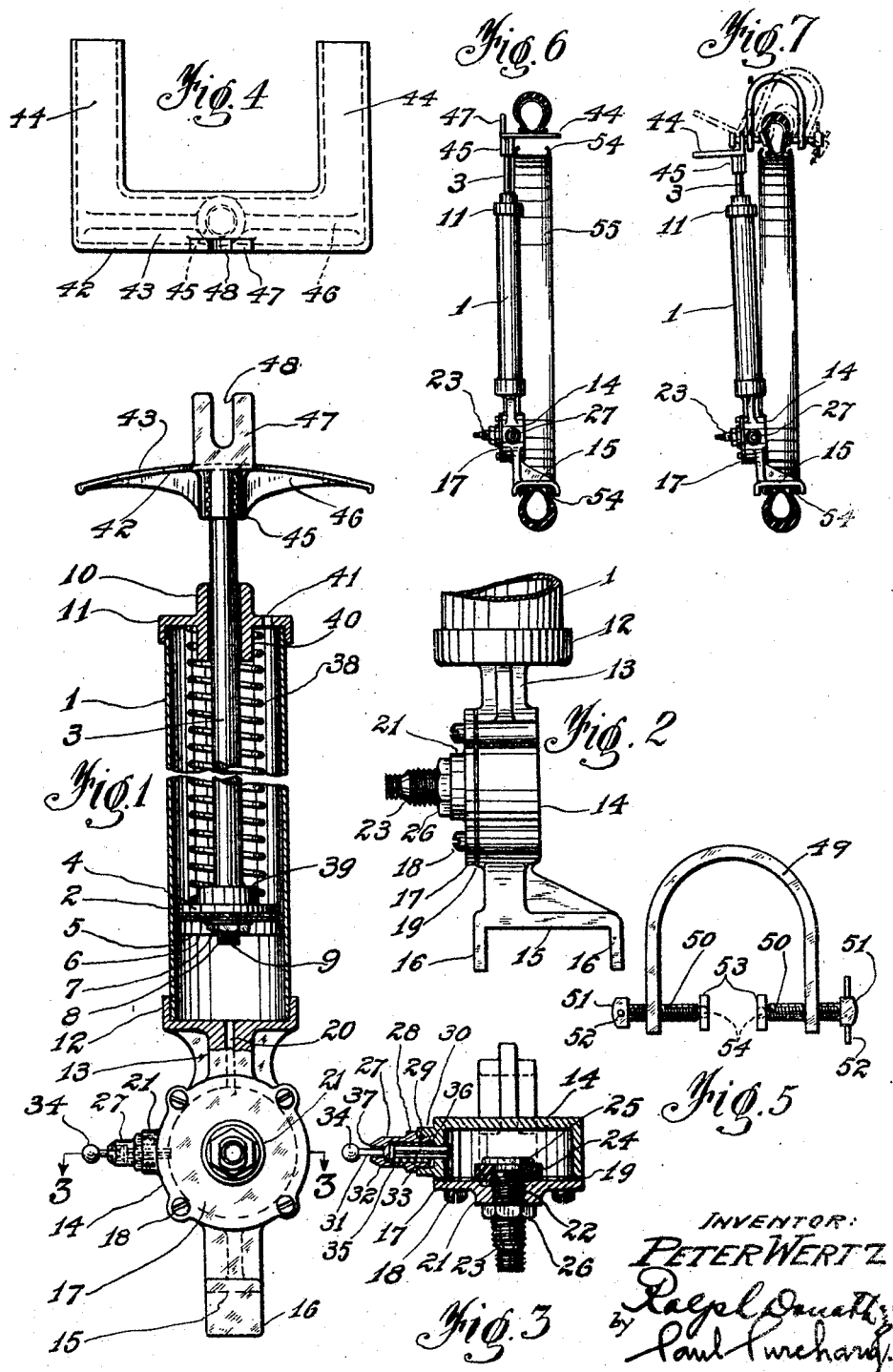
INVENTOR:
PETER WERTZ Patented July 28, 1925.

1,547,544

UNITED STATES PATENT OFFICE.

PETER WERTZ, OF CRAFTON, PENNSYLVANIA.

TIRE MOUNTING AND REMOVING DEVICE.

Application filed November 26, 1924. Serial No. 752,344.

*To all whom it may concern:*

Be it known that I, PETER WERTZ, a citizen of the United States, residing at Crafton, in the county of Allegheny and State of Pennsylvania, have invented certain new and useful Improvements in Tire Mounting and Removing Devices, of which the following is a specification.

This invention relates to mounting and removing devices for pneumatic tires used on self-propelled vehicles and more in particular to such devices operating with fluid pressure.

One of the principal objects of this invention is to provide a fluid-pressure operated device which greatly expedites the mounting of a tire on a solid rim of the clincher type, and which practically eliminates the danger of damaging or puncturing the inner tube of said tire, as often occurs when employing a so-called tire-iron, now in common use. Another object is to provide a device which is adapted to remove tires from their solid rims. A further object is to provide such a device which is simple in operation and application and which can be manufactured at relatively low cost. Additional features and advantages of this invention will appear from the following description considered in connection with the accompanying drawing forming a part of this application and in which:

Fig. 1 is a front elevation, partly in section of the complete tire mounting device.

Fig. 2 is a fractional side elevation of the lower portion of the device.

Fig. 3 is a cross-section, taken on line 3—3, Fig. 1.

Fig. 4 is a top view of the head-member of the device.

Fig. 5 represents a special tire clamp used for removing a tire from its rim with my device.

Fig. 6 is a view showing the method of mounting a tire on a rim by means of my device.

Fig. 7 is a view showing the method of removing a tire.

Referring to the drawing, my device comprises a cylinder 1 within which is placed a piston 2 consisting of a piston rod 3, a piston head 4 upon which is secured an inverted piston-cup 5 clamped on said head by means of a disc 6, a washer 7 and a bolt nut 8 engaging a threaded stud 9 formed integral with the piston-head. The piston rod is guided by a central hub 10 provided in the upper cylinder-head 11, preferably threaded on the cylinder.

At the lower end of the cylinder is securely threaded the lower cylinder-head 12, connected by means of the depending neck 13 to the air receiver shell 14 provided with the eccentrically disposed base 15, the lugs 16 of which are adequately spaced to straddle the rim of a pneumatic tire.

The shell 14 is closed by means of a cover 17 which is secured thereon by the screws 18; a suitable gasket 19 being inserted between these two parts to insure a tight connection. The shell and the cylinder communicate with each other by means of a drilled conduit 20 of suitable bore to afford the best operating conditions for the device.

Centrally disposed on said cover is a boss 21 having a suitably threaded aperture 22 to accommodate a tire-valve 23 of a standard design now in general use, and which, therefore, need not be described in detail. A resilient washer 24, preferably of rubber, is inserted between the cover and the flanged head 25 of said valve to prevent the escape of air between the threads of the valve, and the latter is additionally secured on said cover by means of a lock-nut 26.

For the purpose of releasing the fluid under pressure from the cylinder and air receiver, a release-valve 27 is provided preferably on the side of the shell. This valve may be of any suitable design, or may even be replaced by a pet-cock. The valve shown in the drawing comprises a valve body 28 secured by means of the threaded extension 29 in a boss 30 cast on the receiver-shell. A valve stem 31, having a conic disc 32, a cruciform guide 33 and a push-button 34 is movably mounted in said valve body and is normally pressed outwardly against the valve seat 35 provided in the valve body by means of the coil spring 36. The stem-aperture 37 in said body provides enough clearance to permit the escape of air when the valve stem is depressed.

Mounted within the cylinder and surrounding the piston-rod is a coiled wire spring 38, the purpose of which is to automatically return the piston into normal or closed position when the pressure within the cylinder is released. This spring is preferably centralized by means of a flange 39 provided on the piston and the inwardly directed hub-extension 40 cast on the upper cylinder-head. A small vent-hole 41 is also provided in the latter to enable the escape of air from the upper part of the cylinder, thereby preventing the formation of a counter acting pressure therein.

Removably secured on the end of the piston-rod is the head-member 42 comprising an arcuate center portion 43 and the two parallel fingers 44 disposed at right angles to the center portion. The under-side of the latter is provided with a central hub 45 which is freely engaged by the piston-rod, and with suitable strengthening ribs 46. Centrally disposed at the top of said center portion and at the rear edge thereof is the upwardly directed lug 47, having a central slot 48 and which is used for removing tires from their rims, in a manner to be described hereafter.

Forming also a part of the device is a tire clamp composed of the U-shaped member 49, in the legs of which are provided adjacent their ends threaded apertures which are engaged by the clamping screws 50. The latter have each a head 51, preferably provided with suitable pins 52 to afford a better grip and greater leverage. The inner ends of said screws carry the clamping plates 53 which are freely secured thereon by means of a ball and socket connection 54, to enable the former to assume any position required when clamping the sides of a tire.

Having described the various parts of the device, its mode of application and operation will be readily understood and may be briefly stated as follows:—

Assuming that a tire is to be mounted upon a tire rim, the former is first fitted into the latter by hand as far as possible. This operation is relatively easy to perform, except for the last section of the tire which has to be forced over the flanges 54 of the rim 55. The device is now resorted to and is used in the manner shown in Fig. 6. That is, the eccentrically disposed base is set against the rim at a point opposite the un-fitted portion of the tire, the fingers 44 of the head-member are now introduced between the tire and the rim and fluid pressure (derived preferably from an air pump) is now forced unto the cylinder through the air valve 23 until the tire is sufficiently extended to clear the rim-flanges. The tire is then adjusted to be in proper alignment with the rim and the air in the cylinder is released by pressing on the push-button of the release-valve 27. The fingers of the head-member are now carefully extracted from under the tire and the un-fitted portion of the latter is finally inserted in the rim.

To remove a tire from a rim, the tire is clamped laterally the required amount to enable the beads thereof to clear the flanges of the rim. The device is then applied to the rim in a similar manner as stated above with the exception that the head-member 42 is turned around so that one of the clamping screws may engage the slot 48 of the lug 47. Fluid pressure is then applied to the cylinder with the result that, owing to the eccentric application of the force on the tire clamp, the tire will be expanded and simultaneously pushed sideways away from the rim, as shown in broken lines in Fig. 7. Upon completion of this operation, the pressure within the device is again released by means of the release-valve.

By referring to Figs. 6 and 7, it will be noted that the reason for placing the base 15 off-center, is to maintain the device substantially parallel to the tire and rim and thus obtain the most suitable operating condition, while at the same time preventing any slipping of the tire on the head-member.

As will be understood, as suggested herein, there may be slight changes made in the construction and arrangement of the details of my invention without departing from the field and scope of the same, as fall within the sphere of the appended claims in this application, in which the preferred form only of my invention is disclosed.

I claim:

1. In a tire mounting and removing device of the character described, the combination of a base; a cylinder; an air-receiver positioned intermediate said base and cylinder and communicating with the latter; said base being disposed eccentrically relative to said cylinder and adapted to straddle transversely over the rim of a tire; a piston operable within said cylinder and having a piston-rod extending beyond said cylinder; guiding means for said piston-rod; a head-member freely mounted on said piston-rod and comprising an arcuate center-portion and a plurality of fingers disposed laterally on said center-portion and adapted to engage the inner periphery of a tire; means to convey fluid pressure in said cylinder and means for releasing said fluid pressure.

2. In a tire mounting and removing device of the character described, the combination of a base; a cylinder; an air-receiver positioned intermediate said base and cylinder and communicating with the latter; said base being disposed eccentrically relative to said cylinder and being adapted to straddle transversely over the rim of a tire; a clamping-member for laterally clamping a tire; a piston operable within said cylinder and having a piston-rod extending beyond said cylinder; guiding means for said piston-rod; a head-member freely mounted on said piston-rod and comprising an arcuate center-portion, a plurality of fingers disposed laterally on said center-portion and a bifurcated lug positioned centrally on said center-portion and opposite said fingers and adapted to cooperate with said clamping-member; means for conveying fluid pressure in said cylinder; means for releasing said fluid pressure, and means for automatically returning said piston into normal position upon releasing said fluid pressure.

In testimony whereof I affix my signature.

PETER WERTZ.